(12) United States Patent
Huffington et al.

(10) Patent No.: US 9,905,026 B1
(45) Date of Patent: Feb. 27, 2018

(54) PHOTOGRAMMETRIC IDENTIFICATION OF LOCATIONS FOR PERFORMING WORK

(71) Applicant: The Boeing Company, Chicago, IL (US)

(72) Inventors: Jay R. Huffington, Enumclaw, WA (US); Paul W. Reed, Seattle, WA (US); Kevin L. Salt, Mount Vernon, WA (US); Bryan K. Jobes, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/264,784

(22) Filed: Sep. 14, 2016

(51) Int. Cl.
*G06K 9/00* (2006.01)
*G06T 7/73* (2017.01)
*G06T 7/11* (2017.01)
*G06T 7/66* (2017.01)
*G06T 7/90* (2017.01)

(52) U.S. Cl.
CPC .............. *G06T 7/74* (2017.01); *G06T 7/11* (2017.01); *G06T 7/66* (2017.01); *G06T 7/90* (2017.01); *G05B 2219/40543* (2013.01); *G05B 2219/45059* (2013.01); *G06T 2207/10024* (2013.01); *G06T 2207/10152* (2013.01); *G06T 2207/30244* (2013.01)

(58) Field of Classification Search
CPC .... G06T 7/74; G06T 7/90; G06T 7/66; G06T 7/11; G06T 2207/10024; G06T 2207/30244; G06T 2207/10152; G05B 2219/45059; G05B 2219/40543

See application file for complete search history.

(56) References Cited

U.S. PATENT DOCUMENTS

| 6,154,279 | A  | * | 11/2000 | Thayer | G01B 11/22 356/602 |
| 6,343,863 | B1 | * | 2/2002 | Wood | G03B 21/00 353/13 |
| 7,454,265 | B2 |   | 11/2008 | Marsh | |
| 8,300,983 | B2 | * | 10/2012 | Pinault | B24B 9/146 351/110 |

(Continued)

FOREIGN PATENT DOCUMENTS

JP        H07181011 A        7/1995

OTHER PUBLICATIONS

Floating nut plate, http://www.lisi-aerospace.com, Aug. 25, 2016.

(Continued)

*Primary Examiner* — Aaron W Carter
(74) *Attorney, Agent, or Firm* — Duft Bornsen & Fettig LLP

(57) ABSTRACT

Systems and methods are provided for identifying a location to perform work (e.g., drilling.). One exemplary method includes acquiring images of a hole in a first object from multiple lighting angles, processing the images to identify shadows cast by a wall of the hole at each of the lighting angles, and analyzing the shadows to determine an orientation of a central axis of the hole in a coordinate system of the first object. The method also includes, at a second object, selecting a location to drill that will be aligned with the central axis of the hole of the first object, and drilling the second object at the location.

28 Claims, 11 Drawing Sheets

(56) References Cited

U.S. PATENT DOCUMENTS

| | | | | |
|---|---|---|---|---|
| 8,320,710 B2* | 11/2012 | Pinault | ................... | B24B 9/146 351/110 |
| 2006/0103158 A1* | 5/2006 | Morrison | .............. | B60P 7/0892 296/37.5 |
| 2010/0074556 A1* | 3/2010 | Pinault | ................... | B24B 9/146 382/291 |
| 2010/0092068 A1* | 4/2010 | Pinault | ................... | B24B 9/146 382/141 |
| 2012/0259452 A1* | 10/2012 | Yoshimoto | .............. | B23B 49/04 700/186 |
| 2013/0283594 A1* | 10/2013 | Iwaki | ................ | H05K 13/0061 29/428 |

OTHER PUBLICATIONS

Photogrammetry—Wikipedia, the free encyclopedia, Aug. 10, 2016.
European Search Report; EP17178722; dated Jan. 4, 2018.

* cited by examiner

PHOTOGRAMMETRIC IDENTIFICATION OF LOCATIONS FOR PERFORMING WORK

FIELD

The disclosure relates to the field of photogrammetry, and in particular, to using photogrammetry to identify locations at which to perform work on a part.

BACKGROUND

Aircraft fairing panels enhance the aerodynamic profile of an aircraft, while at the same time shielding underlying components of the aircraft (e.g., brackets, stringers, hoopwise frames, etc.) from direct exposure to the elements. For example, fairing panels may cover a side-of-body intersection that unites a wing of an aircraft to a body of the aircraft.

Since the intersections between structural aircraft components (e.g., the wings, the fuselage, the tail) each vary on an aircraft-by-aircraft basis, it remains infeasible to precisely and accurately predict (e.g., to the tenth of a centimeter) the location at which mounting points at the intersection will be placed for a fairing panel. Thus, technicians are forced to insert hole locators into each mounting point at an intersection, tape the hole locators in place to prevent the hole locators from falling out, place the fairing into the desired installation region, and hammer each hole locator into the fairing to mark a specific location for drilling through the fairing. If the fairing moves or shifts during this process, some holes drilled through the fairing will be placed at the wrong location and will not properly align with the underlying mounting points. Thus, the process of mounting a fairing is manually intensive and time consuming.

For at least these reasons, aircraft manufacturers continue to desire enhanced techniques for reducing the amount of time and human effort involved in installing a fairing.

SUMMARY

Embodiments described herein utilize photogrammetric techniques to identify the location and orientation of each mounting receptacle (e.g., mounting point, mounting hole, etc.) for an aircraft fairing. Utilizing this information, locations to perform work on a fairing (e.g., by drilling holes that are aligned with the mounting points) may be automatically determined without labor intensive manual processes.

One embodiment is a method that includes acquiring images of a hole in a first object from multiple lighting angles, processing the images to identify shadows cast by a wall of the hole at each of the lighting angles, and analyzing the shadows to determine an orientation of a central axis of the hole in a coordinate system of the first object. The method also includes, at a second object, selecting a location to drill that will be aligned with the central axis of the hole of the first object, and drilling the second object at the location.

A further exemplary embodiment is a method that includes acquiring photographs of mounting brackets at an installation region for a fairing of an aircraft, orienting the photographs in a coordinate space of the aircraft, based on photogrammetry targets depicted in the photographs, and analyzing the photographs to determine center lines of mounting receptacles at the mounting brackets. The method also includes selecting locations on the fairing based on a center line of a corresponding mounting receptacle, and generating a Numerical Control (NC) program directing a robot to perform work at each of the locations on the fairing.

A further exemplary embodiment is a non-transitory computer readable medium embodying programmed instructions which, when executed by a processor, are operable for performing a method. The method includes acquiring photographs of mounting brackets at an installation region for a fairing of an aircraft, orienting the photographs in a coordinate space of the aircraft, based on photogrammetry targets depicted in the photographs, analyzing the photographs to determine center lines of mounting receptacles at the mounting brackets, selecting locations on the fairing based on a center line of a corresponding mounting receptacle, and generating a Numerical Control (NC) program directing a robot to perform work at each of the locations on the fairing.

A further exemplary embodiment is a system that includes a camera that acquires photographs of mounting brackets at an installation region for a fairing of an aircraft. The system further includes a design controller that orients the photographs in a coordinate space of the aircraft based on photogrammetry targets depicted in the photographs, analyzes the photographs to determine center lines of mounting receptacles at the mounting brackets, selects locations on the fairing based on a center line of a corresponding mounting receptacle, and generates a Numerical Control (NC) program directing a robot to perform work at each of the locations on the fairing.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
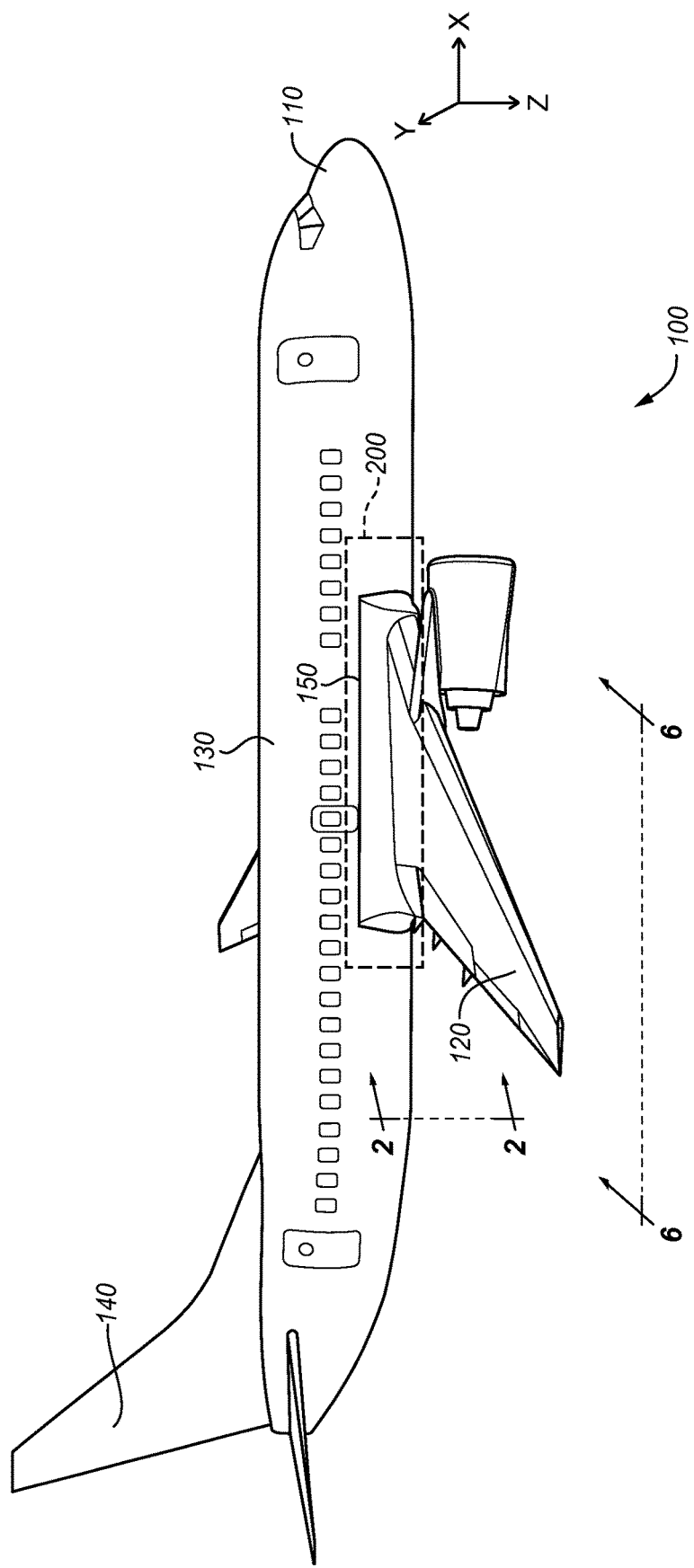
FIG. 1 is a perspective view of an aircraft in an exemplary embodiment.
Figure 2:
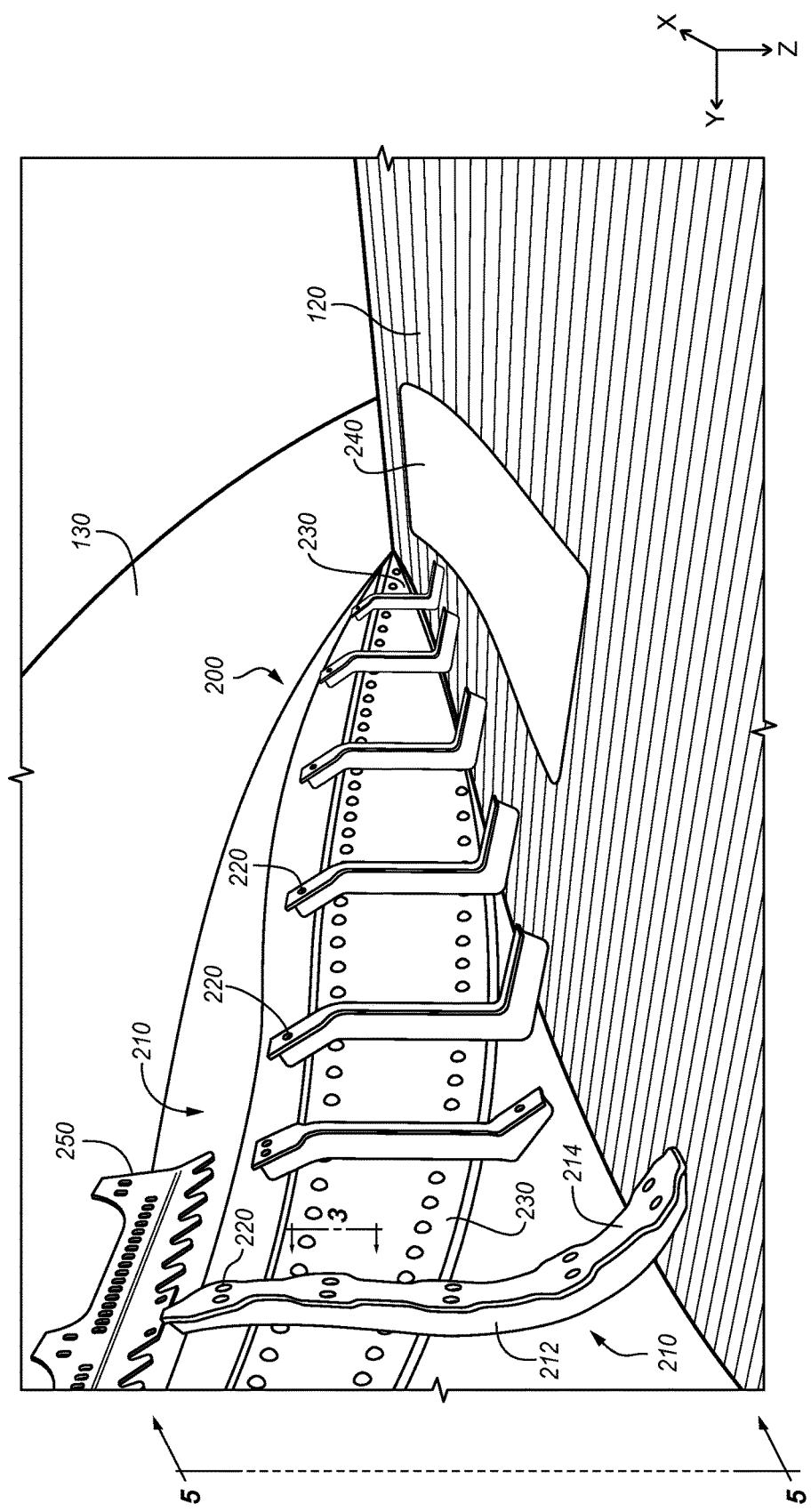
FIG. 2 is a view of an installation region for a fairing of an aircraft in an exemplary embodiment.

FIGS. 1-2 illustrate the structure of an exemplary aircraft which utilizes a fairing 150 to cover an intersection between structural components. Specifically, FIG. 1 illustrates aircraft 100, which includes nose 110, wings 120, fuselage 130, and tail 140. Fairing 150 is installed at installation region 200, where wing 120 and fuselage 130 unite. Installation region 200 may also be referred to as a side of body intersection. As used herein, any region in which a fairing may be installed is referred to as an "installation region," and installation regions may be found in numerous locations along aircraft 100 (e.g., at an intersection between tail 140 and fuselage 130). FIG. 1 also illustrates a downward direction (Z) for aircraft 100.

FIG. 2 is a zoomed in perspective view of installation region 200 for fairing 150 in an exemplary embodiment, illustrated by view arrows 2 of FIG. 1. In FIG. 2, fairing 150 has been removed to illustrate underlying structural components at that are covered by fairing 150. As shown in FIG. 2, installation region 200 includes fairing support structure 230. Installation region 200 further includes mounting brackets 210, which serve the purpose of retaining/holding fairing 150 at fuselage 130 and/or wing 120. Brackets 210 also each include a face 214 and a backing 212. Each face 214 includes mounting receptacles 220. Removable cover 240 is placed over a portion of wing 120, and prevents damage to wing 120 while also providing a no-slip surface upon which to work.

Figure 3:
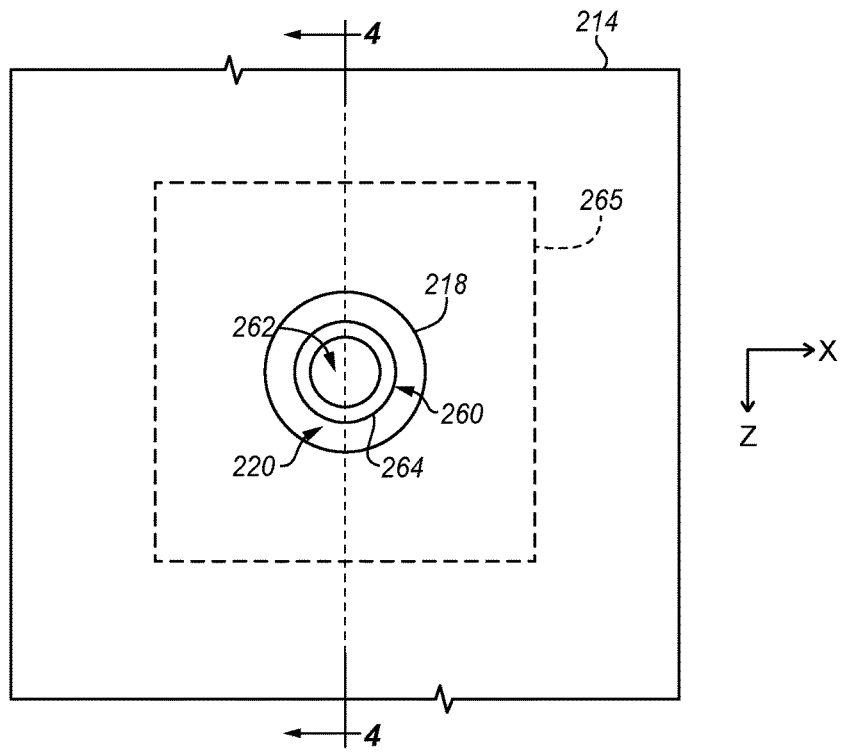
FIG. 3 is a front view of a mounting receptacle for a fairing in an exemplary embodiment.

FIG. 3 is a front view of a mounting receptacle 220 (e.g., hole) for fairing 150 in an exemplary embodiment. Specifically, FIG. 3 corresponds with view arrows 3 of FIG. 2. In this embodiment, mounting receptacle 220 is a portion of face 214. Behind mounting receptacle 220 is nut plate 260, which is located between face 214 and bracket 210 (shown in FIG. 2). In further embodiments where nut plate 260 does not exist, mounting receptacle 220 may include threading for receiving a fastener. Also, although in this embodiment it is nut plate 260 which includes a threaded hole 262 defined by walls 264 for holding a fastener, in further embodiments mounting receptacle 220 may comprise a threaded hole dimensioned to hold a bolt or other fastener that attaches fairing 150 to mounting bracket 210.

Figure 4:
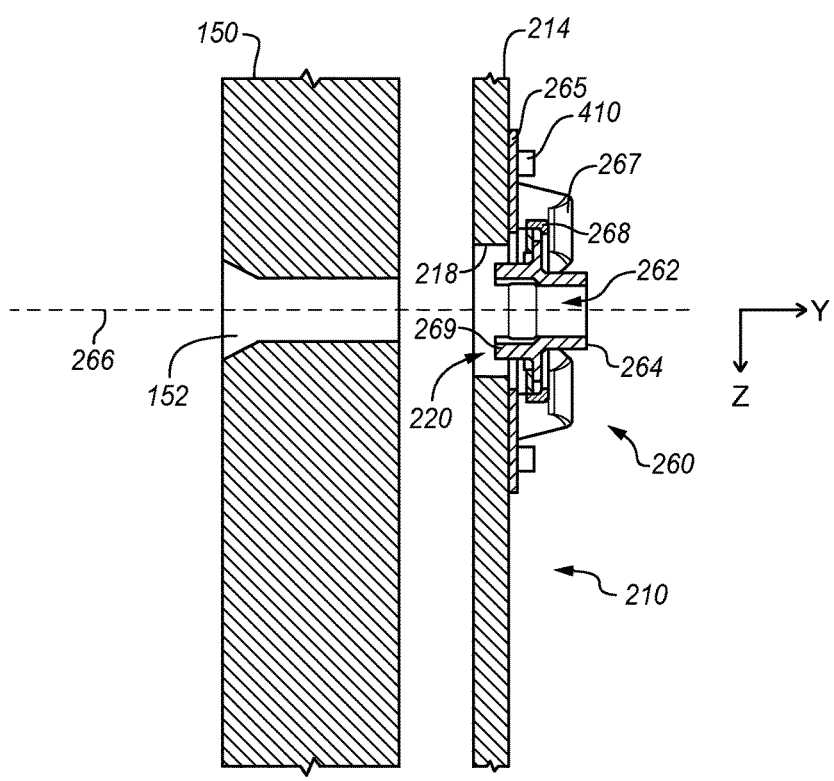
FIG. 4 is a section cut view of the mounting receptacle of FIG. 3 in an exemplary embodiment.

FIG. 4 is a section cut view of the mounting receptacle of FIG. 3 in an exemplary embodiment. Specifically, FIG. 4 is illustrated by view arrows 4 of FIG. 3. In this embodiment, nut plate 260 is a floating nut plate that includes base 265, which is hard-fastened (e.g., riveted, welded, bolted, screwed, bonded etc.) to mounting bracket 210 (e.g., via fastener 410). Base 265 includes flanges 267, which hold floating element 269 in place while allowing a range of motion into and out of the page along the X axis. Furthermore, collar 268 enables floating element 269 to float vertically (e.g., along axis Z) within receptacle 220 of face 214. In further embodiments, nut plate 260 may be a fixed nut plate, or may be foregone altogether.

As shown in FIG. 4, fairing 150 includes hole 152, which is aligned with (e.g., has the same central/long axis 266 as) mounting receptacle 220. Fairing 150 has been drilled out to include hole 152 (e.g., a drilled, countersunk hole) for receiving a fastener (e.g., a bolt, rivet, etc.) that attaches fairing 150 to mounting bracket 210 via mounting receptacle 220 and nut plate 260. In a further embodiment in which a nut plate 260 is not used, receptacle 220 may include threading or other features for coupling with a fastener. FIG. 4 further illustrates that mounting receptacle 220 is defined by walls 218 of face 214.

Figure 5:
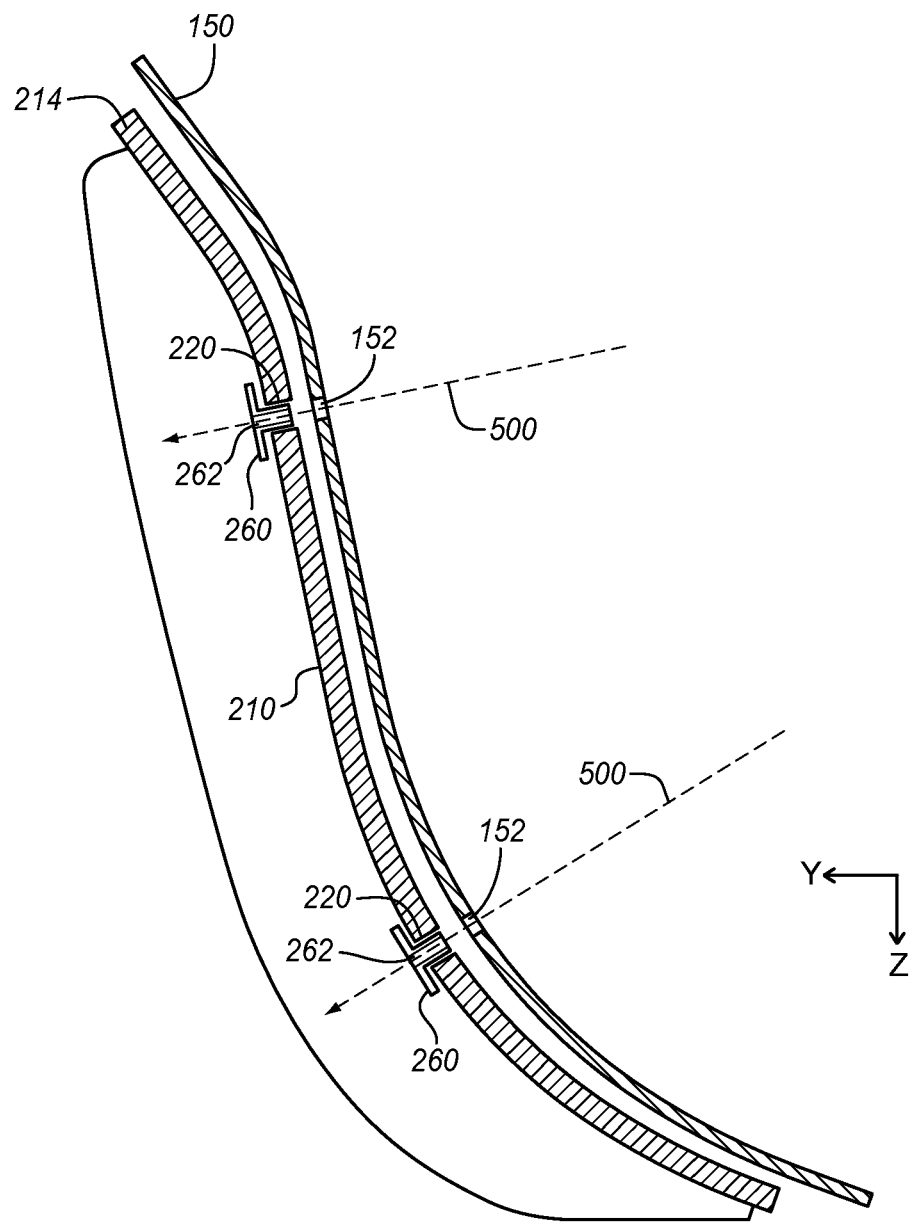
FIG. 5 is a section cut view of a fairing attached to a mounting bracket via mounting receptacles in an exemplary embodiment.

FIG. 5 is a section cut view of a fairing 150 attached to a mounting bracket 210 via mounting receptacles 220 in an exemplary embodiment. Specifically, FIG. 5 corresponds with view arrows 5 of FIG. 2. As shown in FIG. 5, long axes/central axes 500 for receptacles 220 (and/or holes 262) proceed through fairing 150 at various different angles. The angle at which each central axis 500 proceeds through fairing 150, and the precise location through which each central axis 500 proceeds through fairing 150, is unknown before fairing 150 covers face 214.

Figure 6:
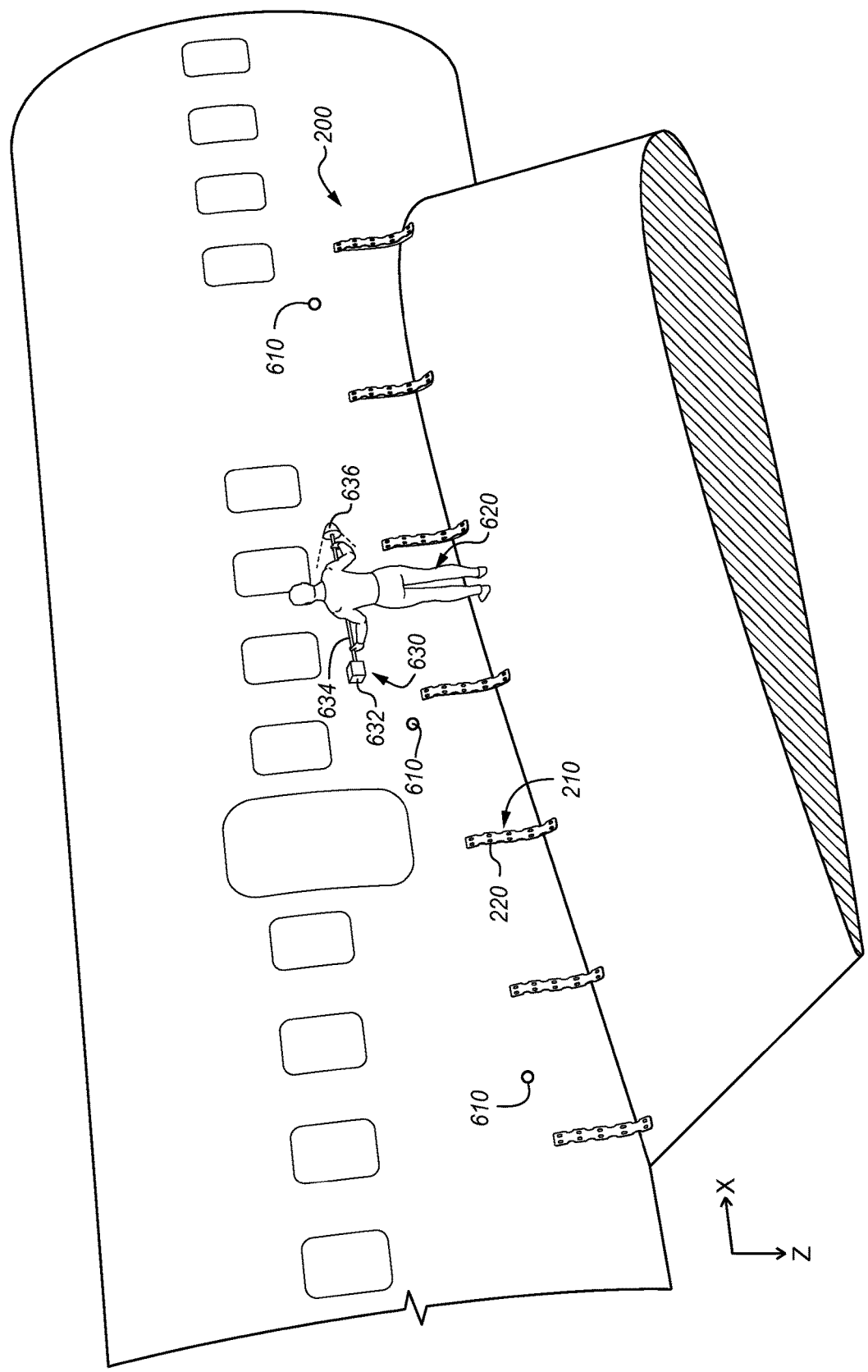
FIG. 6 is a side view of an installation region of a fairing in an exemplary embodiment.

In order to predictively determine locations at which to perform work at fairing 150 (e.g., by drilling through fairing 150 to create holes 152 that are aligned with/have central axes collinear with central axes 500), FIG. 6 illustrates a photogrammetric measuring device 630. FIG. 6 is a side view indicated by views arrows 6 of FIG. 1. FIG. 6 illustrates that photogrammetric targets 610 may be placed in region 200 in order to enable photographic data to be placed into the coordinate space of aircraft 100. Device 630 acquires photographs of installation region 200 (e.g., such that each photograph includes one or more photogrammetric targets). Device 630 includes shaft 634, to which camera 632 and light source 636 are mounted. Thus, when operator 620 utilizes device 630, operator 620 controls an orientation/angle of light source 636 with respect to camera 632. By acquiring multiple photographs and digitally "stitching" the photographs together into a point cloud of data in the coordinate space of aircraft 100, a complete understanding of the geometry of installation region 200 (including mounting brackets 210, and any receptacles 220 therein) may be understood. Furthermore, when photographs are acquired from multiple lighting angles, the orientation of each hole 262 may also be determined. Thus, the photogrammetric techniques described herein enhance versatility when attempting to quantify the nature of installation region 200 and/or mounting brackets 210. In particular, these techniques enhance the ability to accurately discern hole center points for panels/fairings having a variety of complex contours.

Figure 7:
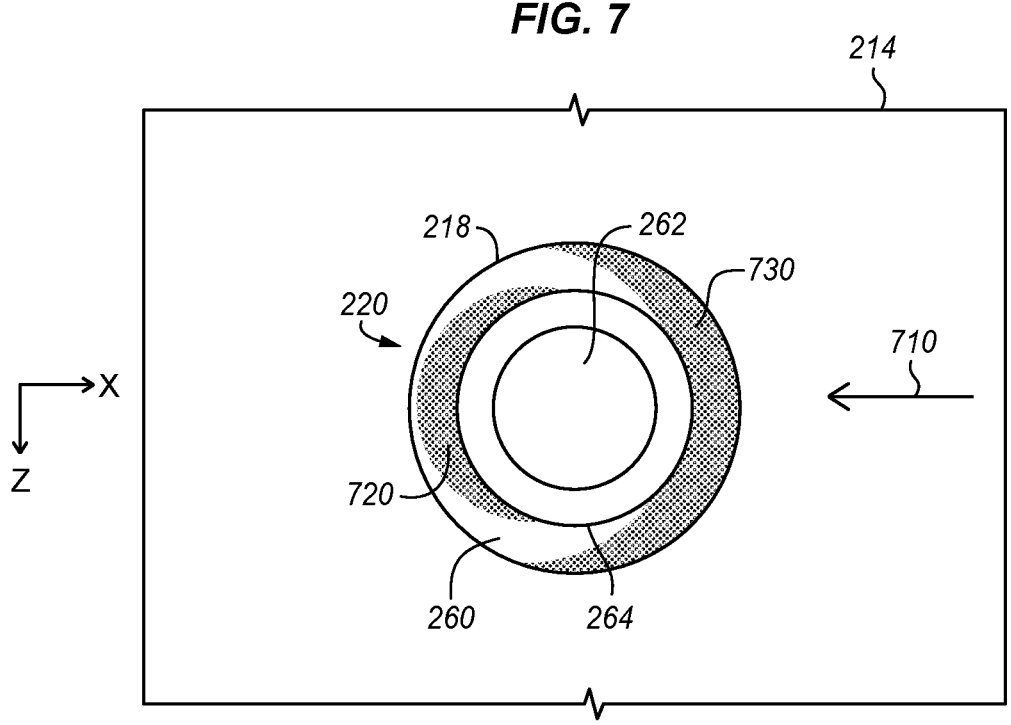
FIGS. 7-8 illustrate shadows cast by a mounting receptacle in response to changes in light direction.
Figure 8:
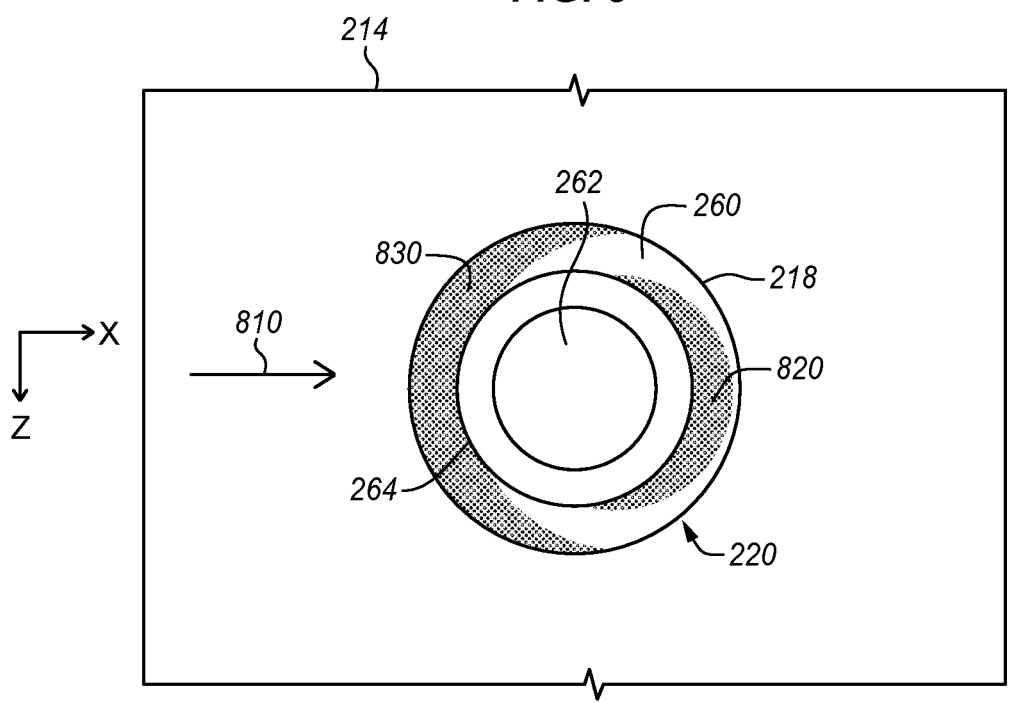

FIGS. 7-8 illustrate shadows for a mounting receptacle 220 in response to changes in light direction. That is, FIG. 7 illustrates a shadow 720 cast by wall 264 when a light source 636 transmits light 710 from the right of hole 262, as well as a shadow 730 cast by wall 218 onto nut plate 260. Meanwhile FIG. 8 illustrates a shadow 820 cast by wall 264 when light source 636 transmits light 810 from the left of hole 262, as well as a shadow 830 cast by wall 218 onto nut plate 260. By imaging shadows 730 and 830 while light source 636 is oriented at a variety of angles, an understanding of the precise center point location and orientation of each receptacle 220 may be achieved.

Figure 9:
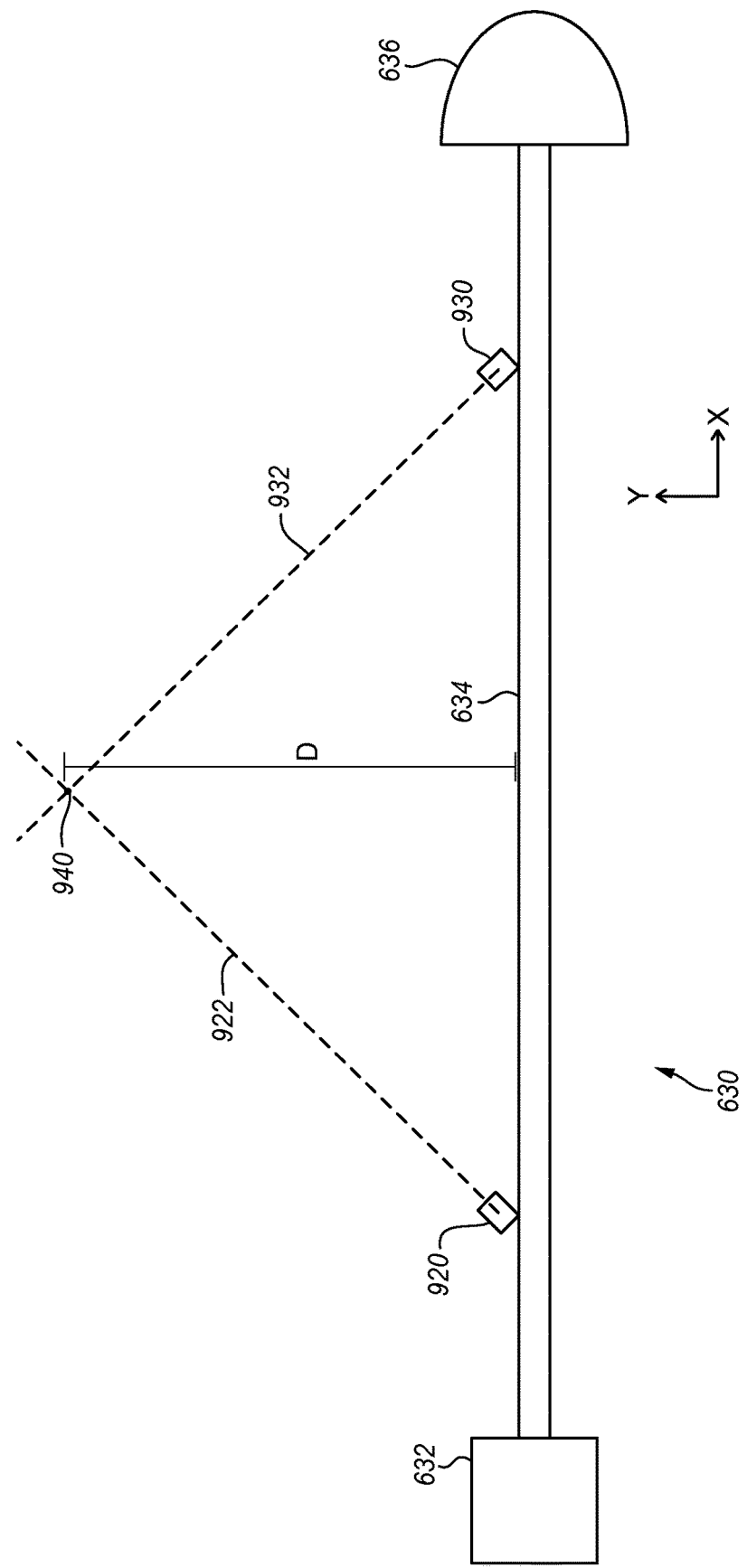
FIG. 9 illustrates a photogrammetric measuring device for analyzing an installation region for a fairing in an exemplary embodiment.

FIG. 9 illustrates further details of photogrammetric measuring device 630 in an exemplary embodiment. As shown in FIG. 9, device 630 includes lasers 920 and 930, which transmit beams 922 and 932, respectively. Beams 922 and 932 intersect at point 940. This arrangement enables device 630 to be placed an appropriate distance (D) from point 940 in order to acquire a photograph/image.

Figure 10:
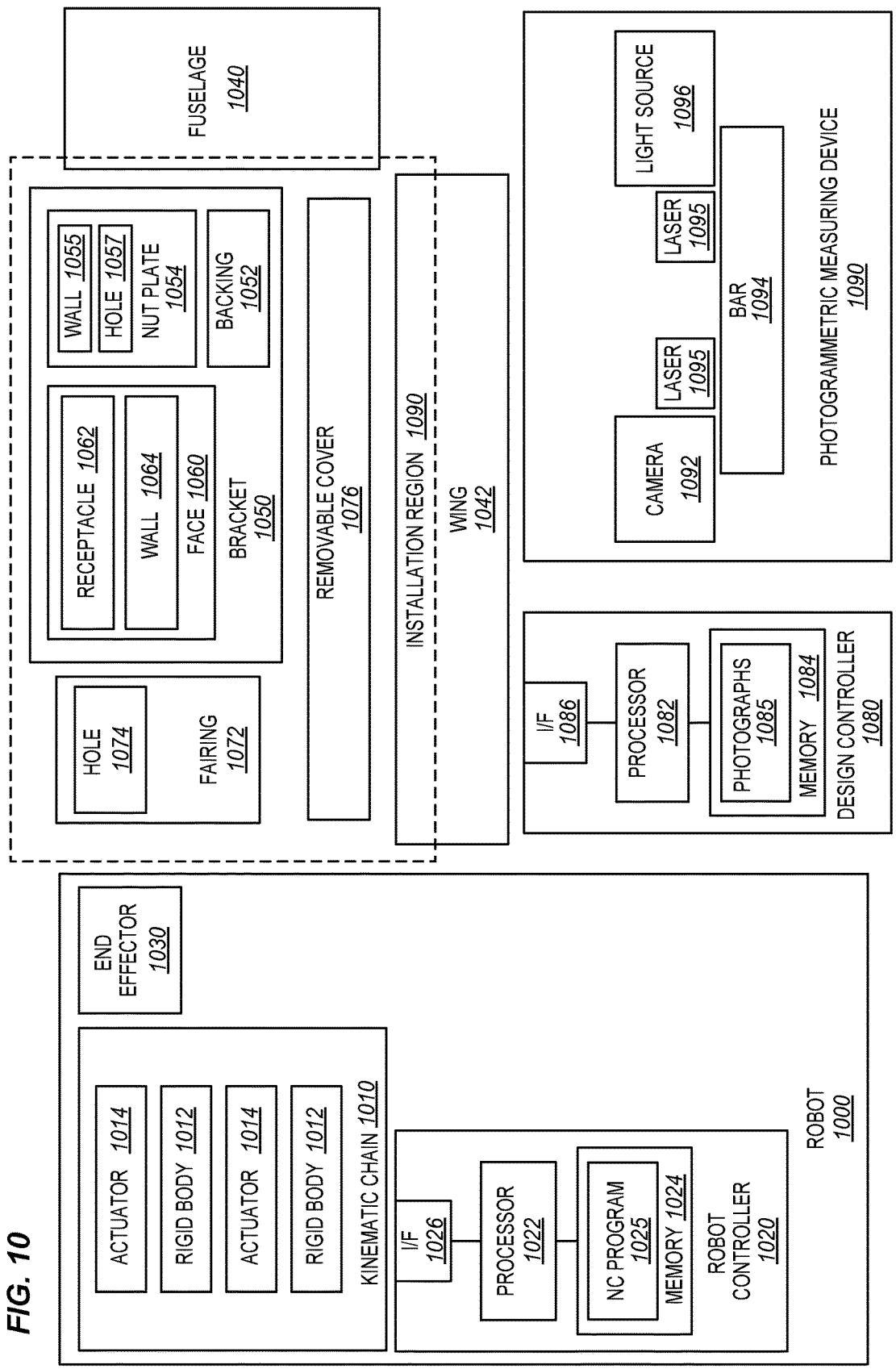
FIG. 10 is a block diagram of a system for installing a fairing in an exemplary embodiment.

Further details of the various components involved in the installation of fairing 150 are described with regard to FIG. 10. FIG. 10 is a block diagram of a system for installing fairing 150 in an exemplary embodiment. As shown in FIG. 10, installation region 1090 is proximate to wing 1042 and fuselage 1040, and is protected by cover 1076. One or more brackets 1050 are found within installation region 1090, including backing 1052 and face 1060. In a similar fashion, nut plates 1054 (including wall 1055 and hole 1057) are illustrated. FIG. 10 further depicts face 1060 (having receptacle 1062 defined by wall 1064), and fairing 1072 (having hole 1074 that has been drilled by robot 1000). The location at which to place hole 1074 in fairing 1072 is determined based on input from photogrammetric measuring device 1090, which includes bar 1094, lasers 1095, camera 1092, and light source 1096. Photographs 1085 from camera 1092 are stored in memory 1084 of design controller 1080 via interface (I/F) 1086. I/F 1086 may comprise an Ethernet cable, Universal Serial Bus (USB) cable, IEEE 802.11 wireless protocol interface, etc. Processor 1082 of design controller 1080 designs NC program 1025 based on an analysis of photographs 1085, and NC program 1025 directs the operations of robot 1000. Design controller 1080 may be implemented, for example, as custom circuitry, as a processor executing programmed instructions, or some combination thereof. For example, in one embodiment design controller 1080 is implemented as a computer running a program for creating NC programs.

Robot 1000 of FIG. 10 performs drilling operations in accordance with NC program 1025 in order to perform work at fairing 1072 (e.g., to drill one or more holes 1074 into fairing 1072). In this embodiment, robot 1000 includes robot controller 1020, which directs the operations of robot 1000 as robot 1000 performs work. Robot controller 1020 includes memory 1024 (storing NC program 1024), processor 1022, and I/F 1026. Robot controller 1020 may be implemented, for example, as custom circuitry, as a processor executing programmed instructions, or some combination thereof. Robot 1000 further includes kinematic chain 1010, which includes one or more rigid bodies 1012 that are repositioned by actuators 1014 in order to adjust an orientation (e.g., direction of facing) and/or position of end effector 1030. End effector 1030 comprises a tool capable of performing an operation/work (e.g., constructive work, such as drilling, fastener installation, etc.) upon fairing 1072 that modifies fairing 1072, or capable of inspecting fairing 1072 in detail in response to instructions from NC program 1025.

Illustrative details of the operation of the various components of FIG. 10 will be discussed with regard to FIG. 11. Assume, for this embodiment, that fairing 150 has not yet been installed at region 200, and that no work (e.g., drilling) has yet been performed on fairing 150. Thus, the precise locations at which to perform work upon fairing 150 are not yet known. Further assume that photogrammetry targets 610 have been placed at installation region 200 for fairing 150. This may include placing a photogrammetry target 610 a predetermined offset distance and/or direction from each bracket 210 and/or receptacle 220, and may further comprise placing photogrammetry targets 610 at predetermined locations along fuselage 130 and/or wing 120. Placing targets 610 as reference points in this manner ensures that photographs which depict targets 610 may be placed/located in a known coordinate space for aircraft 100. Targets 610 may comprise retroreflectors (e.g., retroreflective tape), highly reflective targets, uniquely colored targets, etc., and may have a known shape and size (e.g., a circle having a 1 centimeter diameter).

Figure 11:
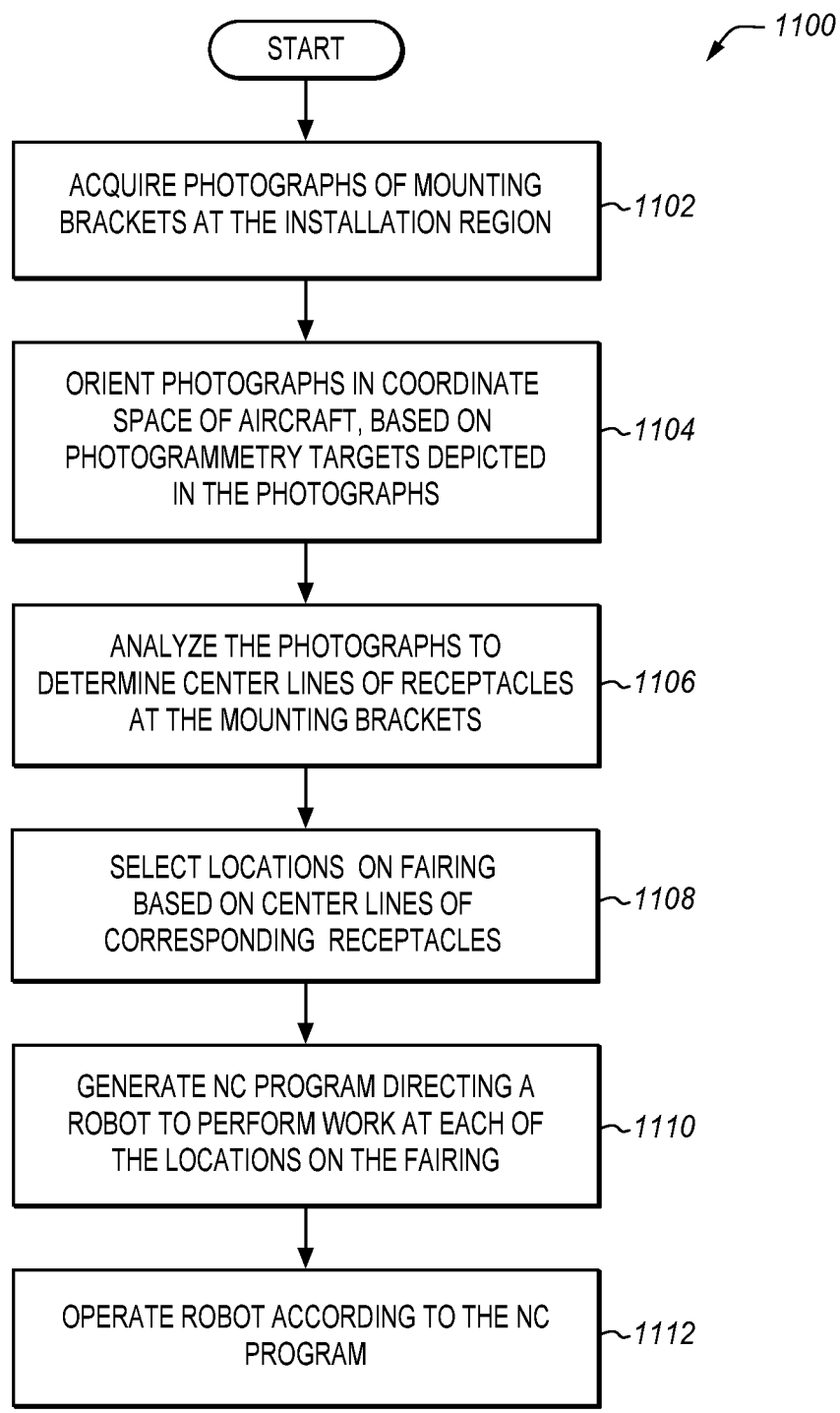
FIGS. 11-12 are flowcharts illustrating methods for automatically detecting locations to perform work on a fairing in an exemplary embodiment.

FIG. 11 is a flowchart illustrating a method for automatically detecting locations to perform work on a fairing in an exemplary embodiment. The steps of method 1100 are described with reference to the systems illustrated in FIGS. 1-10, but those skilled in the art will appreciate that method 1100 may be performed in other systems. The steps of the flowcharts described herein are not all inclusive and may include other steps not shown. The steps described herein may also be performed in an alternative order.

After targets 610 have been placed, photogrammetric measuring device 630 acquires photographs of mounting brackets 210 at installation region 200 via camera 632 (step 1102). Each photograph depicts one or more targets 610 (e.g., enough targets 610 to perform photogrammetric analysis of the photograph). Furthermore, the photographs are taken from a variety of lighting angles (e.g., by taking multiple sets of photographs, each set from a different lighting angle). By acquiring multiple sets of photographs that each correspond with a different lighting angle, shadows cast by wall 218 of receptacle 220 may be analyzed to determine the exact position and orientation of each receptacle 220.

After photographs 1085 have been acquired into memory 1084 via interface (I/F 1086), design controller 1080 orients the photographs in a coordinate space of aircraft 100, based on the photogrammetry targets depicted in the photographs (step 1104). This may be performed, for example, by analyzing a shape, orientation, and/or size of each target 610 within a photograph, in order to place/orient/locate image data from the photograph into a coordinate space for aircraft 100. The photogrammetric targets are placed at known positions in the coordinate system of aircraft 100. Thus, design controller 1080 may interpret the location from which the photograph was taken. In a further embodiment, targets 610 may include scale bars (e.g., along each of multiple axes) in order to facilitate the locating of photographic image data in the coordinate space of aircraft 100. The image data (e.g., pixels) within each photograph may further be transformed into a 3D point cloud via photogrammetric techniques.

Processor 1084 of design controller 1080 analyzes the photographs to determine a center line (e.g., a central axis 500, corresponding with a center point and orientation) of each receptacle 220 (step 1106). This may comprise identifying each receptacle 220 based on an offset from a target 610, and analyzing shadows cast from the receptacle 220 at a variety of lighting angles (e.g., two or more lighting angles) in order to identify the center line of the receptacle 220. In one embodiment, this technique involves analyzing shadows at each of the mounting receptacles at multiple lighting angles. For example, analyzing shadows for a receptacle 220 may include identifying an expected location (e.g., nominal location) of the mounting receptacle 220 in a photograph (e.g., as indicated by/offset from a target 610), searching outward from the expected location using a grayscale pixel array and segmentation to identify high contrast areas in the photographs depicting the mounting receptacle 220 and determining a center point of the receptacle 220 based on the high contrast areas. For example, given that receptacle 220 has a known size, controller 1080 may search for a high contrast area similar in diameter to a known diameter of mounting receptacle 220. This reduces the chances of mistaking hole 262 for mounting receptacle 220, since the sizes of these elements differ. In a further example, controller 1080 may define a search area that is centered on the expected location of mounting receptacle 220, and is larger than mounting receptacle 220. Controller 1080 may then search the exterior of the search area, continuing to narrow the search until a high contrast area is found (e.g., a substantially contiguous area where neighboring pixels vary in brightness from each other by at least thirty percent). This also reduces the changes of mistaking hole 262 for mounting receptacle 220, because a search that starts at the outer boundaries of the search area will find mounting receptacle 220 before finding hole 262. If a receptacle 220 is detected as being in an out-of-tolerance location or orientation, design controller 1080 may report that condition to a user via I/F 1086, or via any other suitable interface (e.g., in order to update a display).

With the center line of each receptacle 220 known, controller 1080 proceeds to select locations on fairing 150 for performing work on fairing 150 (step 1108). Each location is chosen (and/or oriented) based on the center line of a corresponding receptacle 220. Furthermore, this process may involve identifying how fairing 1072 will be installed in region 200 of aircraft 100, and converting from the coordinate space of aircraft 100 to a coordinate space of fairing 1072 and/or robot 1000. In this manner, each location selected for performing work on fairing 150 aligns with a receptacle 220.

Design controller 1080 generates a Numerical Control (NC) program that directs robot 1000 to perform work at each of the selected locations on fairing 1072 (step 1110). For example, controller 1080 may determine a desired location of fairing 150 over a receptacle 220, and may determine an orientation and position of a hole 152 that will be drilled into fairing 150 to align with the receptacle 220. Controller 1080 may further generate instructions for operating actuators 1014 of robot 1000 in kinematic chain 1010, in order to reposition end effector 1030 to perform work (e.g., drilling) corresponding to each receptacle 220. Robot controller 1020 further proceeds to operate robot 1000 (e.g., by directing actuators 1014 and/or end effector 1030) according to NC program 1025, based on the center points and orientations of mounting receptacles 220 (step 1112).

Utilizing method 1100 provides a substantial benefit by providing techniques for automatically identifying where to perform work and/or how to orient work performed on a fairing for an aircraft. These techniques beneficially utilize photogrammetry in order to program a robot to perform work as desired. Since installation regions for fairings are likely to vary from aircraft to aircraft, such an automated process enhances the speed and efficiency of tasks related to identifying work locations, and also performing work at the determined locations.

Figure 12:
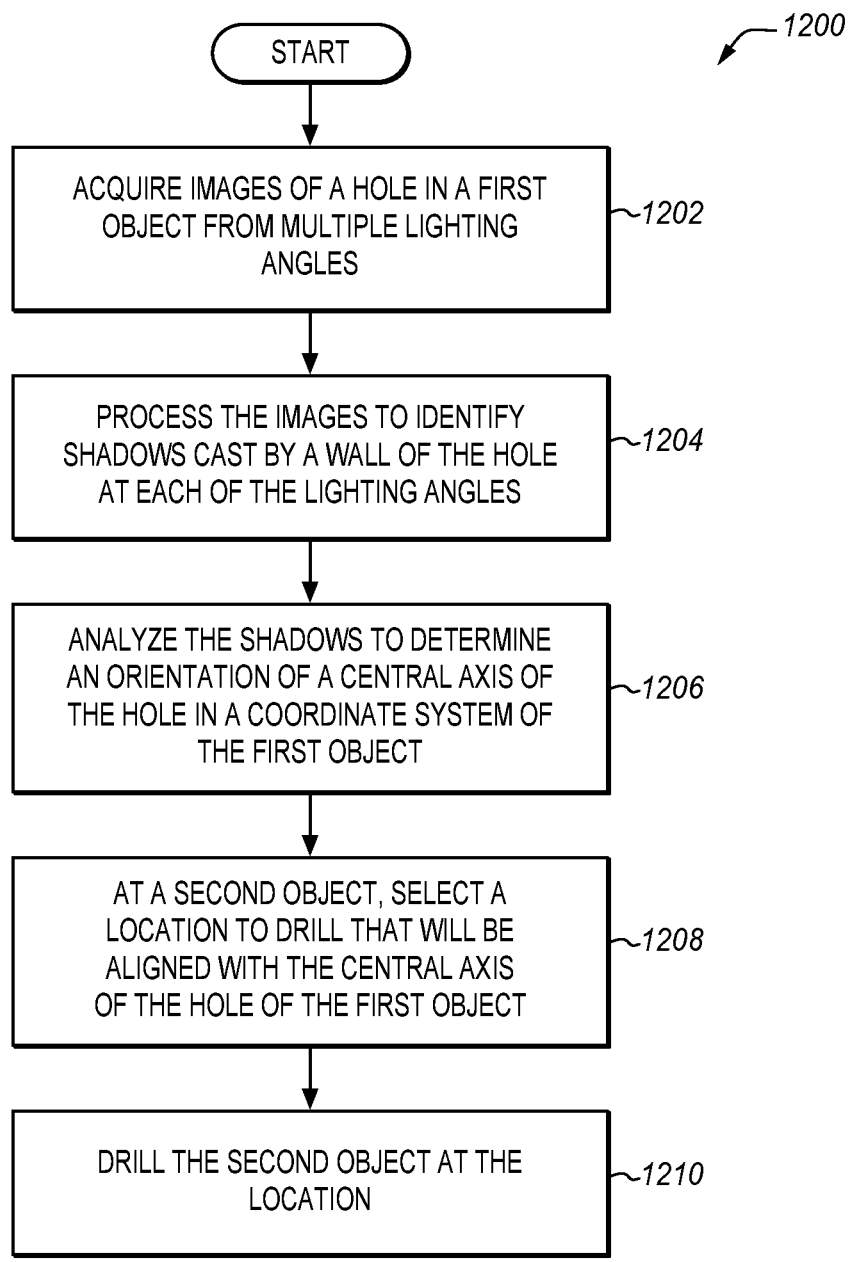

FIG. 12 illustrates a further method 1200 for performing work upon an object. According to FIG. 12, images/photographs of a hole (e.g., receptacle 220) in a first object (e.g., mounting bracket 210) are acquired by controller 1080 via camera 632, from multiple lighting angles, of a hole (step 1202). Controller 1080 further processes the images to identify shadows (e.g., 830, 730) cast by a wall 218 of the hole (e.g., receptacle 220) (step 1204). The shadows may be identified by identifying a photogrammetric target 610 in an image, defining a search area (e.g., an offset search area) based on the photogrammetric target 610, and searching for neighboring pixels in the search area that exhibit differences in contrast of at least thirty percent. Controller 1080 further analyzes the shadows to determine an orientation of a central axis (e.g., long axis 500) of the hole, in a coordinate system of the first object (step 1206). The orientation and center point of wall 218 may be identified based on the locations of the shadows at various lighting angles, and this may allow for determination of the orientation of the central axis. That is, controller 1080 may identify a location of camera 632 for each photograph, as well as a location of light source 636 in each photograph, based on the arrangement of one or more photogrammetric targets in each image. Given that the height of wall 218 is known, the length of shadows cast by wall 218 from various angles indicate the orientation of wall 218. Furthermore, the location of wall 218 may be determined based on the shadows (e.g., the borders of the shadows). Since wall 218 is normal to the hole (e.g., receptacle 220), the orientation of the central axis may be determined based on the location of wall 218. Furthermore, since shadows are cast from multiple locations on wall 218, the center point of the hole may be determined based on the location of wall 218 as indicated by the shadows.

Controller 1080 further selects, at a second object, a location to drill that will be aligned with the central axis of the hole of the first object (step 1208). The second object (e.g., fairing 150) will be mated to the first object via the hole. The location may be selected by translating the central axis of the hole into a coordinate system of the second object. The location may be indicated in an NC program, which then directs robot controller 1020 as robot 1000 drills the second object (step 1210).

Examples

Figure 13:
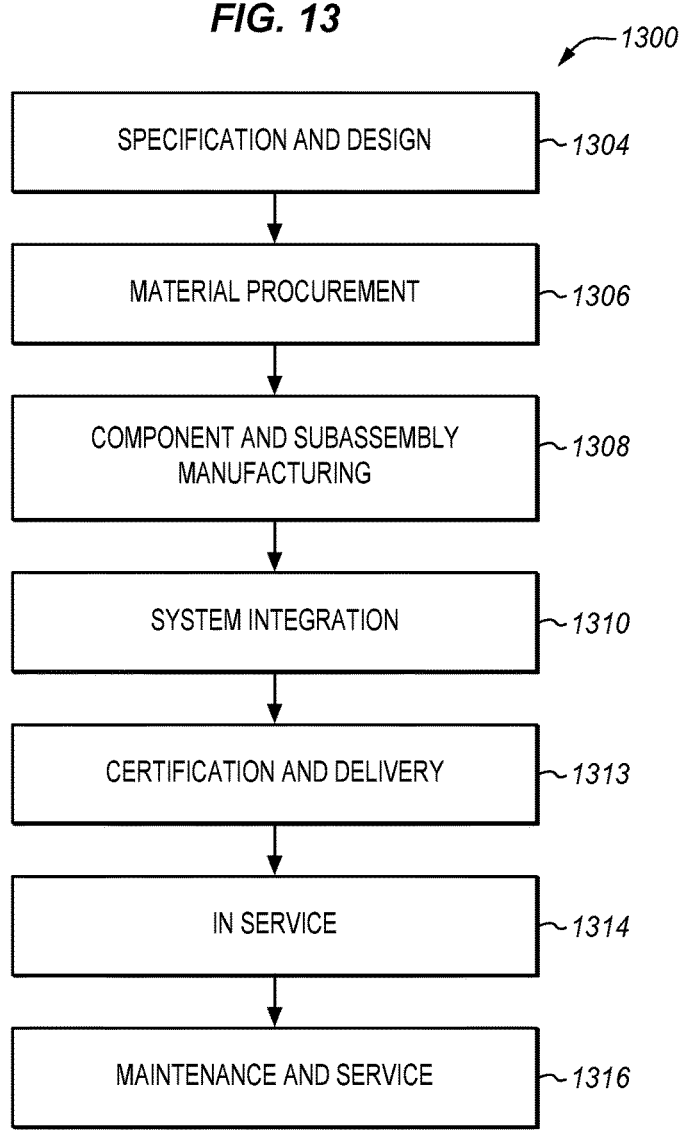
FIG. 13 is a flow diagram of aircraft production and service methodology in an exemplary embodiment.
Figure 14:
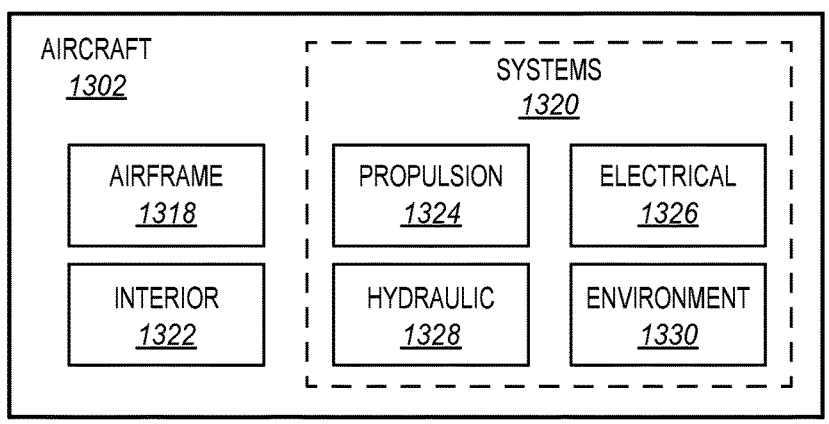
FIG. 14 is a block diagram of an aircraft in an exemplary embodiment.

In the following examples, additional processes, systems, and methods are described in the context of installing fairings for aircraft. Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on). Apparatus and methods embodied herein may be employed during any one or more suitable stages of the production and service method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion 1324, electrical 1326, hydraulic 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316. For example, the techniques and systems described herein may be used for steps 1306, 1308, 1310, 1314, and/or 1316, and/or may be used for airframe 1318 and/or interior 1322. These techniques and systems may even be utilized for systems 1320, including for example propulsion 1324, electrical 1326, hydraulic 1328, and/or environmental 1330.

In one embodiment, fairing 150 comprises a portion of airframe 118, and is manufactured during component and subassembly manufacturing 1308. Fairing 150 is installed in system integration 1310, and then is utilized in service 1314 until wear renders fairing 150 unusable. Then, in maintenance and service 1316, fairing 150 may be discarded and replaced with a newly manufactured part. Techniques described herein for analyzing an installation region for fairing 150, and performing work on fairing 150, may be performed each time a fairing 150 is installed. Furthermore, the techniques described herein may be utilized for matching any suitable structural hole matching environments, including for example at airframe 1318, interior 1322, and/or propulsion 1324.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
acquiring images of a hole in a first object from multiple lighting angles;
processing the images to identify shadows cast by a wall of the hole at each of the lighting angles;
analyzing the shadows to determine an orientation of a central axis of the hole in a coordinate system of the first object;
at a second object, selecting a location to drill that will be aligned with the central axis of the hole of the first object; and
drilling the second object at the location.

2. The method of claim 1 further comprising:
identifying the shadows by:
identifying a photogrammetric target in an image;
defining a search area based on the photogrammetric target; and
searching for neighboring pixels in the search area that exhibit differences in contrast of at least thirty percent.

3. The method of claim 1 wherein:
analyzing the shadows comprises identifying a location of the wall based on the shadows, and determining the orientation of the central axis based on the location of the wall.

4. The method of claim 1 wherein:
the location is selected by translating the central axis of the hole into a coordinate system of the second object.

5. A method comprising:
acquiring photographs of mounting brackets at an installation region for a fairing of an aircraft;
orienting the photographs in a coordinate space of the aircraft, based on photogrammetry targets depicted in the photographs;
analyzing the photographs to determine center lines of mounting receptacles at the mounting brackets;
selecting locations on the fairing based on a center line of a corresponding mounting receptacle; and
generating a Numerical Control (NC) program directing a robot to perform work at each of the locations on the fairing.

6. The method of claim 5 wherein:
acquiring the photographs comprises photographing the mounting receptacles at multiple lighting angles; and
analyzing the photographs comprises analyzing shadows at each of the mounting receptacles at each of the lighting angles.

7. The method of claim 6 wherein:
analyzing shadows at a mounting receptacle comprises:
identifying an expected location of the mounting receptacle in a photograph;
searching outward from the expected location to identify high contrast areas in the photographs; and determining a center point of the mounting receptacle based on the high contrast areas.

8. The method of claim 5 wherein:
the installation region comprises an intersection between a fuselage of the aircraft and a body of the aircraft.

9. The method of claim 8 wherein:
the mounting receptacles comprise holes in the mounting brackets.

10. The method of claim 5 wherein:
the NC program includes instructions for positioning and operating an end effector of the robot.

11. The method of claim 5 wherein:
locating the photographs comprises determining an orientation of a camera that acquired each photograph, based on locations, sizes, and shapes of photogrammetric targets depicted in the photograph.

12. The method of claim 5 further comprising:
operating the robot to perform work on the fairing according to the NC program.

13. A non-transitory computer readable medium embodying programmed instructions which, when executed by a processor, are operable for performing a method comprising:
acquiring photographs of mounting brackets at an installation region for a fairing of an aircraft;
orienting the photographs in a coordinate space of the aircraft, based on photogrammetry targets depicted in the photographs;
analyzing the photographs to determine center lines of mounting receptacles at the mounting brackets;
selecting locations on the fairing based on a center line of a corresponding mounting receptacle; and
generating a Numerical Control (NC) program directing a robot to perform work at each of the locations on the fairing.

14. The medium of claim 13 wherein:
acquiring the photographs comprises photographing the mounting receptacles at multiple lighting angles; and
analyzing the photographs comprises analyzing shadows at each of the mounting receptacles at each of the lighting angles.

15. The medium of claim 14 wherein the method further comprises:
analyzing shadows at a mounting receptacle comprises:
identifying an expected location of the mounting receptacle in a photograph;
searching outward from the expected location to identify high contrast areas in the photographs; and
determining a center point of the mounting receptacle based on the high contrast areas.

16. The medium of claim 13 wherein:
the installation region comprises an intersection between a fuselage of the aircraft and a body of the aircraft.

17. The medium of claim 16 wherein:
the mounting receptacles comprise holes in the mounting brackets.

18. The medium of claim 13 wherein:
the NC program includes instructions for positioning and operating an end effector of the robot.

19. The medium of claim 13 wherein:
locating the photographs comprises determining an orientation of a camera that acquired each photograph, based on locations, sizes, and shapes of photogrammetric targets depicted in the photograph.

20. The medium of claim 13 wherein:
operating the robot to perform work on the fairing according to the NC program.

21. A system comprising:
a camera that acquires photographs of mounting brackets at an installation region for a fairing of an aircraft; and
a design controller that orients the photographs in a coordinate space of the aircraft based on photogrammetry targets depicted in the photographs, analyzes the photographs to determine center lines of mounting receptacles at the mounting brackets, selects locations on the fairing based on a center line of a corresponding mounting receptacle, and generates a Numerical Control (NC) program directing a robot to perform work at each of the locations on the fairing.

22. The system of claim 21 wherein:
the camera acquires the photographs by photographing the mounting receptacles at multiple lighting angles, and the design controller analyzes the photographs by analyzing shadows at the mounting receptacles at each of the lighting angles.

23. The system of claim 21 wherein:
the design controller analyzes shadows at a mounting receptacle by: identifying an expected location of the mounting receptacle in a photograph, searching outward from the expected location to identify high contrast areas in the photographs, and determining a center point of the mounting receptacle based on the high contrast areas.

24. The system of claim 21 wherein:
the installation region comprises an intersection between a fuselage of the aircraft and a body of the aircraft.

25. The system of claim 24 wherein:
the mounting receptacles comprise holes in the mounting brackets.

26. The system of claim 21 wherein:
the NC program includes instructions for positioning and operating an end effector of the robot.

27. The system of claim 21 wherein:
the design controller locates the photographs by: determining an orientation of a camera that acquired each photograph, based on locations, sizes, and shapes of photogrammetric targets depicted in the photograph.

28. The system of claim 21 further comprising:
a robot controller that operates the robot to perform work on the fairing according to the NC program.

* * * * *